(12) United States Patent
Blevins et al.

(10) Patent No.: US 7,496,041 B2
(45) Date of Patent: Feb. 24, 2009

(54) HIGH SPEED AUTO-TUNING LOOP

(75) Inventors: Terrence L. Blevins, Round Rock, TX (US); Wilhelm K. Wojsznis, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 959 days.

(21) Appl. No.: 10/376,891

(22) Filed: Feb. 28, 2003

(65) Prior Publication Data

US 2004/0170138 A1    Sep. 2, 2004

(51) Int. Cl.
*H04L 12/26* (2006.01)
*G05B 13/02* (2006.01)

(52) U.S. Cl. .......................... 370/241; 700/37
(58) Field of Classification Search ................. 370/241, 370/252, 503, 516; 700/1, 9, 19, 37; 702/127, 702/182–183
See application file for complete search history.

(56) References Cited

U.S. PATENT DOCUMENTS

| | | |
|---|---|---|
| 4,549,123 A | 10/1985 | Hägglund et al. |
| 4,602,326 A | 7/1986 | Kraus |
| 4,903,192 A | 2/1990 | Saito et al. |
| 5,283,729 A | 2/1994 | Lloyd |
| 5,295,061 A | 3/1994 | Katayama et al. |
| 5,311,421 A | 5/1994 | Nomura et al. |
| 5,680,409 A | 10/1997 | Qin et al. |
| 5,748,467 A | 5/1998 | Qin et al. |

(Continued)

FOREIGN PATENT DOCUMENTS

CN    1280659 A    1/2001

(Continued)

OTHER PUBLICATIONS

Search and Examination Report under Sections 17 & 18(3) issued in GB 0404322.0 application by the United Kingdom Patent Office on Jul. 15, 2004.

(Continued)

*Primary Examiner*—Kevin C Harper
(74) *Attorney, Agent, or Firm*—Marshall, Gerstein & Borun LLP (57) ABSTRACT

An auto-tuner is adapted to be used in a distributed process control network having a communications network that communicatively couples a process controller, which executes a process control routine, and one or more process devices used in a process control loop. The auto-tuner includes a first tuning element configured to cause a control entity to force the process loop to undergo an auto-tuning procedure and a tuning data stack operating within one of the process devices to receive and store a tuning signal associated with the control entity along with a time stamp indicating the time the tuning signal was acted on by the device. A measurement data stack is disposed in the same or a different process device and operates to receive and store a response or measurement signal generated by the process device along with a time stamp indicating when the response signal was generated or detected. A second tuning element which may be, for example, in a controller or a workstation, periodically receives data from the tuning data stack and the measurement data stack and determines a tuning parameter to be used in tuning the process loop.

42 Claims, 5 Drawing Sheets

U.S. PATENT DOCUMENTS

| | | |
|---|---|---|
| 5,768,119 A | 6/1998 | Havekost et al. |
| 5,801,942 A | 9/1998 | Nixon et al. |
| 5,828,851 A | 10/1998 | Nixon et al. |
| 5,838,563 A | 11/1998 | Dove et al. |
| 5,847,952 A | 12/1998 | Samad |
| 6,014,612 A * | 1/2000 | Larson et al. ............... 702/183 |
| 6,128,541 A | 10/2000 | Junk |
| 6,330,484 B1 | 12/2001 | Qin |
| 6,445,962 B1 | 9/2002 | Blevins et al. |
| 6,510,353 B1 * | 1/2003 | Gudaz et al. .................. 700/37 |
| 6,847,954 B1 | 1/2005 | Wojsznis et al. |
| 2002/0040250 A1 * | 4/2002 | Gaikwad et al. .............. 700/37 |

FOREIGN PATENT DOCUMENTS

| | | |
|---|---|---|
| CN | 1280684 | 1/2001 |
| GB | 2 348 021 A | 9/2000 |
| WO | WO 98/14851 | 4/1998 |
| WO | WO-99/17042 | 4/1999 |
| WO | WO-99/18508 | 4/1999 |

OTHER PUBLICATIONS

Office Action for corresponding Chinese Application No. 2004100067703.

* cited by examiner

HIGH SPEED AUTO-TUNING LOOP

TECHNICAL FIELD

The present invention relates generally to distributed process control networks and, more specifically, to a device and method for auto-tuning process elements communicatively connected within a distributed process control network.

BACKGROUND

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process used in controlling the operation of the process or may perform any other desired function within the process. Process controllers have historically been connected to field devices via one or more analog signal lines or buses which may carry, for example, 4-20 mA (milliamp) signals to and from the field devices. Generally, the process controller receives signals indicative of measurements made by one or more field devices and/or other information pertaining to the field devices, uses this information to implement a typically complex control routine and then generates control signals which are sent via the analog signal buses to field devices to thereby control the operation of the process.

More recently, there has been a move within the process control industry to implement field-based digital communication within the process control environment. For example, the process control industry has implemented a number of standards including open digital or combined digital and analog communication protocols such as the HART®, PROFIBUS®, WORLDFIP®, Device-Net®, and CAN protocols. These digital communication protocols generally enable more field devices to be connected to a particular network, support more and faster communications between the field devices and the controller and/or allow field devices to send more and different types of information, such as information pertaining to the status and configuration of the field device itself, to the process controller. Furthermore, the standard digital protocols enable field devices made by different manufacturers to be used together within the same process control network.

Also, there is now a move within the process control industry to decentralize process control and, thereby, simplify the individual process controllers. Decentralized control is obtained by having field mounted process control devices, such as valve positioners, transmitters, etc., perform one or more process control functions using what are typically referred to as function blocks or control blocks. The function blocks may communicate data across a network structure for use by other process control devices (or function blocks) in performing other control functions. To implement these control functions, each process control device typically includes a microprocessor having the capability to implement one or more function blocks as well as the ability to communicate with other process control devices using a standard and open communication protocol. In this manner, field devices can be interconnected within a process control network to communicate with one another and to perform one or more process control functions to form a control loop without the intervention of a centralized process controller. The all-digital, two-wire network protocol now being promulgated by Fieldbus Foundation, known as the FOUNDATION® Fieldbus is one open Fieldbus communication protocol that allows devices made by different manufacturers to interoperate and to communicate with one another via a standard network to effect decentralized control within a process.

Tuning of any control block or control loop in a prior art system is fairly simple because the entire tuning routine can be stored in the centralized controller or field device. When tuning of a control loop of such a control routine is desired, the separate tuning block within the controller or field device forces the appropriate control block, such as a proportional-integral (PI) or proportional-integral-derivative (PID) control block, through a tuning procedure like an induced oscillation procedure, to determine predefined characteristics of the process or the loop. During this dynamic data capture phase of the tuning procedure, the tuning block collects data generated by the loop, which is being delivered to the control routine per normal operation, and determines from this data one or more process characteristics, such as the ultimate gain, the time constant, etc. of the process. Once the desired process characteristics are calculated, the tuning block applies a set of rules or other algorithms using the calculated process characteristics to determine new tuning parameters for the control block or control loop. This step is, commonly referred to as the rule application phase of the tuning procedure. Thereafter, the tuning routine delivers the new tuning parameters to the control block (or control loop) and the tuning procedure is complete. Because, in a centralized process control system, all of the control functions are located within the controller and all of the data necessary for tuning is provided to the controller during normal operation of the process, the tuning block has direct access to the control blocks and to the data required to tune the individual control blocks.

Decentralized process control systems, in which control blocks or control elements, such as PI control elements, PID control elements, fuzzy logic control elements, etc., are located in a distributed manner throughout a process control network, are harder to tune because the control blocks are located away from the controller or field device where the tuning block is typically stored. Decentralized process control systems generally communicate in a scheduled or synchronous manner to implement specific control functions associated with the process control routine. During the periods in which synchronous communication is not occurring, other information, such as alarms, set point changes or other diagnostic signals (e.g., tuning signals), may be communicated in a non-scheduled or asynchronous manner. However, a tuning control block configured to communicate in an asynchronous manner is unable to send a deterministic tuning signal to a field device and to receive a deterministic response signal from a field device because the controller or field device must use asynchronous communications to implement the tuning functions. In particular, because the tuning signal is communicated in an asynchronous manner, the controller has no way to detect when the tuning signal is actually received by the field device or when the corresponding response signal is generated, thereby preventing strict control over the timing of the tuning procedure and increasing the likelihood of inaccurate tuning results.

In one known prior art system for implementing tuning in a distributed process control network, the entire network is reconfigured and taken off-line to perform the tuning procedure. In this configuration, the tuning procedure is performed using synchronous communications while the specific control functions are suspended. In another known prior art system used for implementing tuning, the entire tuning routine is placed within the same device as the control block to be tuned (such as the PID function block) and, in fact, may actually be incorporated into the functionality of the control block. While this system is able to control the timing of the tuning procedure precisely and to collect data at any desired rate (up to and including the speed at which the control block is executed), the tuning routine must be compiled along with and at the same time as the control block, which increases the overhead (e.g., the timing, processing, memory, etc. requirements) associated with the use of the control block during normal operation of the process, even though the functionality of the auto-tuning routine is used relatively infrequently during normal operation of the control loop. Furthermore, a complete auto-tuning routine must be placed within each different device in which a control block is located in order to enable auto-tuning of each control block, which adds unneeded redundancy to and increases the cost of the process control system.

SUMMARY

An auto-tuner is adapted to be used in a distributed process control network having a communications network that communicatively couples a process controller, which executes a process control routine, and one or more process devices used in a process control loop. The auto-tuner includes a first tuning element configured to cause a control entity to force the process loop to under go an auto-tuning procedure and a tuning data stack operating within one of the process devices to receive and store a tuning signal associated with the control entity along with a time stamp indicating the time the tuning signal was acted on by the device. A measurement data stack is disposed in the same or a different process device and operates to receive and store a response or measurement signal generated by the process device along with a time stamp indicating when the response signal was generated or detected. A second tuning element which may be, for example, in a controller or a workstation, periodically receives data from the tuning data stack and the measurement data stack and determines a tuning parameter to be used in tuning the process loop.

DETAILED DESCRIPTION

Figure 1:
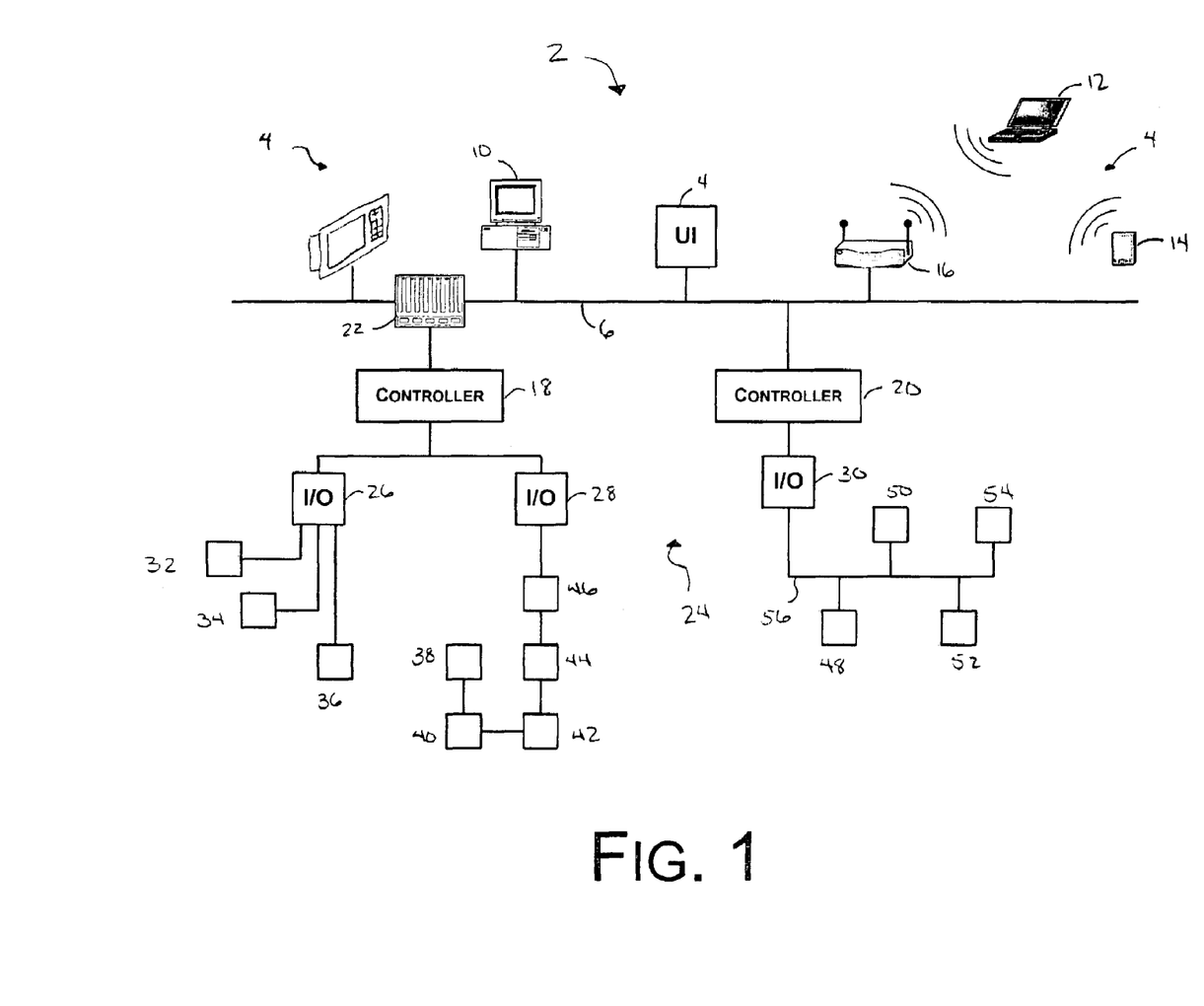
FIG. 1 is a schematic block diagram of a distributed process control network including an auto-tuning system.

FIG. 1 illustrates a distributed control network (DCN) 2 including one or more user interface devices, generally indicated by the numeral 4, connected via a communications network 6. The network 6 may be an Ethernet local area network (LAN) compliant to the IEEE 802.3 standard or any other suitable communication network. The user interface devices 4 may be any variety of networkable terminals such as a touchpanel 8, a personal computer 10, a laptop computer 12 having wireless network capabilities and/or a wireless personal digital assistant 14 (PDA) connected via a wireless router 16. The wireless router 16 may be compliant to the IEEE 802.11x (where the x indicates a specific wireless protocol, such as a, b or g, for example) and allows for seamless communications between the LAN and the wireless devices 12 and 14.

The DCN 2 further includes controllers 18 and 20, which may be connected via a hub 22 operating on the network 6, and which are capable of storing a process control routine in a memory thereof and implementing the process control routine on a processor (not shown within the controllers 18, 20). The controllers 18 and 20 are further capable of communicating with function blocks located in a plurality of field devices distributed throughout the physical process, generally indicated by the numeral 24. The controllers 18 and 20 may be, by way of example only, the DeltaV™ controller sold by Fisher-Rosemont Systems, Inc. and may be configured to use any proprietary or open source communications protocol, such as the HART®, PROFIBUS®, and the Fieldbus protocols. In this configuration, the wireless PDA 14, laptop 12, touchpanel 8 and personal computer 10 may be used to communicate with the controllers 18 and 20 to obtain information about the individual elements of the physical process 24. If the controllers 18 and 20 are DeltaV™ controllers, they may be configured to provide graphic depictions of the process control routine implemented within the controllers 18 and 20. Furthermore, if desired, a user may initiate an auto-tuning routine via any one of the user interfaces 4 connected to the network 6.

The controllers 18 and 20 are connected to numerous field devices located throughout the physical process 24 through any standard input-output (I/O) devices 26, 28, and 30. The I/O device 26 is shown communicating to field devices 32-36 in a point-to-point topography required by the HART® protocol. Alternatively, the I/O device 28 is shown communicatively coupled with the field devices 38-46 in a ring configuration required by the PROFIBUS® protocol, while the I/O device 30 is shown connected to field devices 48-54, which may be Fieldbus devices, using a bus 56 configured to conform to a fieldbus protocol, such as the FOUNDATION® Fieldbus protocol. The I/O devices 26, 28, and 30 may be any standard I/O devices capable of connecting to analog devices using 4-20 mA signals, digital devices using digital protocol signals, or any combination thereof. Furthermore, the field devices 32-54 may be any type of field devices including, but not limited to, optical sensors, thermocouples, valve positioners, servo positioners, valve controllers, etc.

Figures 2, 2A:
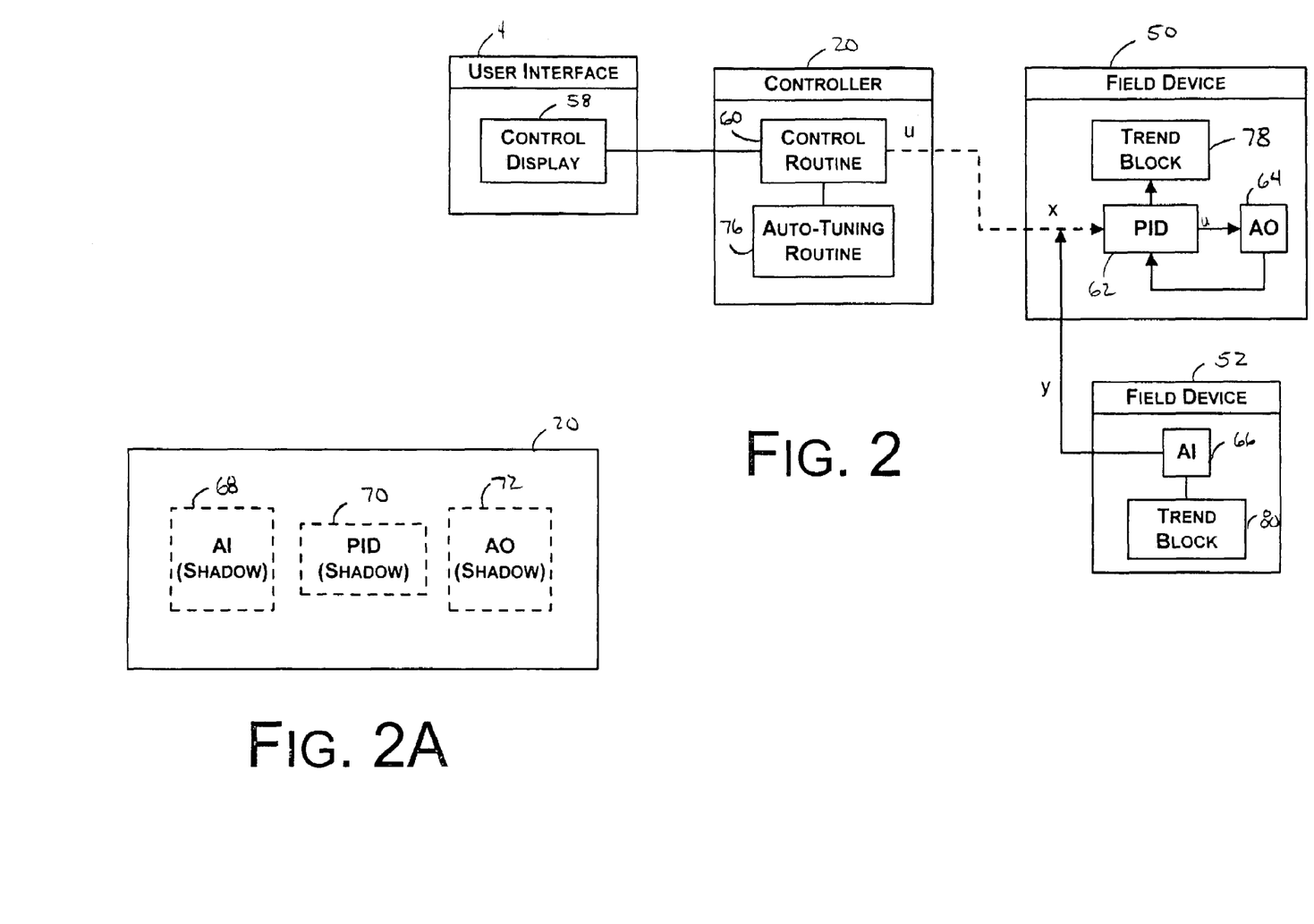
FIG. 2 is schematic block diagram illustrating the information flow in one embodiment of the auto-tuning system of FIG. 1.
FIG. 2A is function block diagram illustrating a control routine in one embodiment of the auto-tuning system of FIG. 1.

FIG. 2 illustrates a schematic block diagram of a set of routines, some of which may be function blocks, connected to form an exemplary auto-tuning loop in the DCN 2 controlling the physical process 24 represented in FIG. 1. In the diagram of FIG. 2, the user interface (UI) 4 includes an active graphical control display 58, which may be generated by a DeltaV™ application, representative of the control routine 60 implemented by the controller 20. It should be noted that, if the UI 4 is a wireless device such as the laptop 12 or the PDA 14, the control display 58 is likely to be an HTML (hypertext markup language) or XML (extensible markup language) representation of the control routine 60 accessible through a web browser such as the Microsoft Internet Explorer® or Netscape Navigator®.

The control routine 60 implemented within the controller 20 may provide for overall monitoring of the field devices 48-54 directly connected to the Fieldbus bus 56 or may be configured to provide control and/or monitoring for the entire DCN 2. In operation, the control routine 60 may be configured to generate a plurality of control signals depending on the particular field devices 32-54 with which communications is occurring or which are being controlled in a particular control loop.

To implement a particular control loop, the control routine 60, as illustrated in FIG. 2, is communicatively connected to a PID function block 62 and to an analog output (AO) function block 64 operating within the field device 50, and to an analog input (AI) function block 66 operating within the field device 52. The control routine 60, as illustrated in more detail in FIG. 2A, may include a shadow AI function block 68, a shadow PID function block 70 and a shadow AO function block 72 each of which is communicatively connected to the corresponding function blocks 66, 62, and 64, respectively in the field devices 50 and 52. The shadow function blocks 68-70, for example, may operate as described in U.S. patent application Ser. No. 09/151,084 entitled "Shadow Function Blocks Interface for Use in a Process Control Network", the disclosure of which is hereby expressly incorporated by reference herein. In this particular example, the shadow function blocks 68-72 are configured to mirror the state of and the data associated with the actual function blocks 62-66 operating remotely within the field devices 50 and 52. The shadow function blocks 68-72 communicate through the Fieldbus bus 56 in an asynchronous manner, such that the control routine 60 operates as if the actual function blocks 62-66 are executing within the controller 20 in a synchronous manner according to the controller execution schedule without having to communicate over the Fieldbus bus 56. Moreover, in the system of FIG. 2, the actual function blocks 62-66 are communicatively coupled together using synchronous Fieldbus communications, indicated by solid lines between these blocks in FIG. 2 to define a control loop 74. It will be well understood that this example is intended to simply illustrate one method of configuring the simple control loop 74, and that other possible configurations include locating the actual PID function block 62 within the controller 20 and sending control commands to the field device 52 in either a synchronous manner or an asynchronous manner, in which case the shadow PID function block 70 would not be necessary. Of course, the PID function block 66 could be located in other field devices as well.

Typically, during the DCN 2 configuration process, the AI function block 66, the PID function block 62 and the AO function block 64 are assigned (possibly consecutive) synchronous communications periods within the Fieldbus macrocycle to thereby define the control loop 74. In this manner, the AI function block 66 can provide the PID function block 62 with a value indicative of a process variable measured at some location within the physical process 24. The PID function block 62, in turn, can determine a control value for driving a field device, such as a valve, which is communicated to the AO function block 64. The AO function block 64 can then provide the measured device under control (e.g., field device 50 and/or 52) with a control signal indicative of the generated control value. The control loop 74 defined by these function blocks iterates this sequence a number of times, depending on the process requirements and gain characteristics, until the value of the measured process variable is equal to a desired value or set-point.

The control routine 60 may include the shadow function blocks 68-70 of FIG. 2A to monitor the state and operation of the actual function blocks 62-66 and provide inputs thereto via asynchronous communications over the Fieldbus bus 56 (as illustrated in FIG. 1.) However, the controller 20 may further include an auto-tuning routine 76 communicatively connected to the control routine 60. It will be understood that the auto-tuning routine 76 may operate within the UI 4 and simply activate a control subroutine within the controller 20, or may be executed within the controller 20, as shown in FIG. 2. The auto-tuning routine 76, upon activation, for example, via the control display 58 or according to a scheduled maintenance cycle, provides a tuning control signal to the control entity or function block (e.g., the PID function block 62) operating within the control loop 74 defined by the function blocks 62-66 to thereby cause the control loop 74 to undergo a tuning procedure. In particular, the auto-tuning routine 76 forces the PID function block 62 to generate a known control signal u' which, for example, causes the control loop 74 to undergo induced oscillations or a step change. An output of the control loop 74, such as an output measured by or associated with the AI function block 66 and the known input (the control signal) and may then be used in any known manner to determine one or more process characteristics of the process to be used to perform tuning. In the exemplary embodiment illustrated in FIG. 2, the auto-tuning routine 76 determines the process characteristics (ultimate gain, time constant, etc.) associated with the process and uses these parameters to determine or update the gains associated with proportional-integral-differential (PID) function block 62.

In operation, the auto-tuning routine 76 instructs the control routine 60, or more specifically the shadow PID function block 70, to drive the process through controlled oscillations or perturbations. As discussed above, Fieldbus communications between the shadow PID function block 70 operating within the control routine 60 and the remote field device 50 occur in an asynchronous manner such that information from the field device 50 is available to the control routine 60 asynchronously and vice versa. Thus, when the shadow PID function block 70 is instructed to undergo controlled perturbations, the instruction is passed, in an asynchronous or unscheduled manner, via the Fieldbus network 56, to the PID function block 62 operating within the field device 50. Because the instruction is sent asynchronously (i.e., whenever there are no scheduled communications), the auto-tuning routine 76 can track when the instruction was issued, but cannot determine when the instruction was actually communicated over the Fieldbus bus 56 or received by the PID function block 62.

Figure 3A:
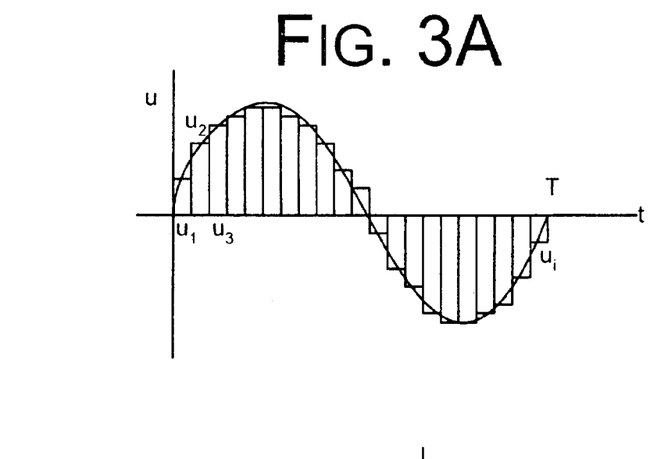
FIGS. 3A-3C are graphs representing signals that may be used and stored in one embodiment of the auto-tuning system of FIG. 1.

FIG. 3A illustrates the original controlled perturbation signal u represented by a continuous sinusoidal signal having a period T that may be used during the auto-tuning procedure. The digital representation of the perturbation signal u is a series of discrete step identified as segments $u_i$ (with the subscript i identifying the discrete time segment corresponding to each segment.) As will be understood, the perturbation signal segments $u_i$ are communicated by the control routine 60, in an asynchronous manner, to the field device 50 as illustrated in FIG. 2 by a dashed line. Because the perturbation signal segments $u_i$ are communicated asynchronously (i.e. in an unscheduled manner), the control routine 60 and the auto-tuning routine 76, by themselves, are unable to precisely determine when the segments are received by the field device 50 and more particularly by the PID function block 62. The practical effect of such a communication system is that the perturbation signal segments $u_i$, shown in FIG. 3A, are communicated at irregular intervals based on system communication availability, resulting in the received perturbation signal segments $x_i$, representatively shown in FIG. 3B.

Figure 3B:
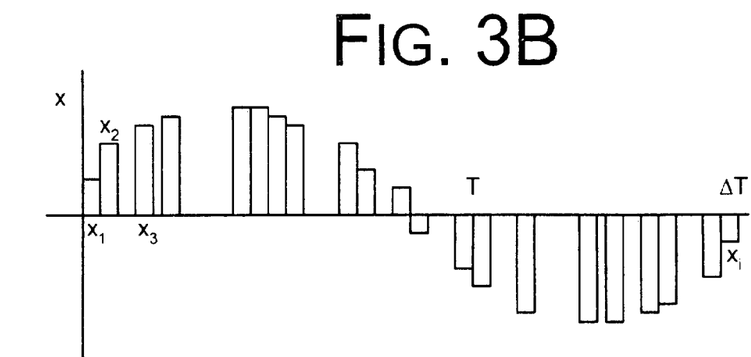

The received perturbation signal segments $x_i$ have identical magnitudes as the original perturbation signal segments $u_i$, while having a total period $T+\Delta T$. The change in period $\Delta T$, indicates the sum total of the communications discrepancies (in the present example a communications lag) between the generation and transmission of the perturbation signal u and the receipt of the perturbation signal x by the field device 50. Alternatively, the received perturbation signals segments $x_i$ may have the same or about the same period but might not be received in a strictly periodic manner and thus may no longer form a simple sinusoidal signal.

Figure 4:
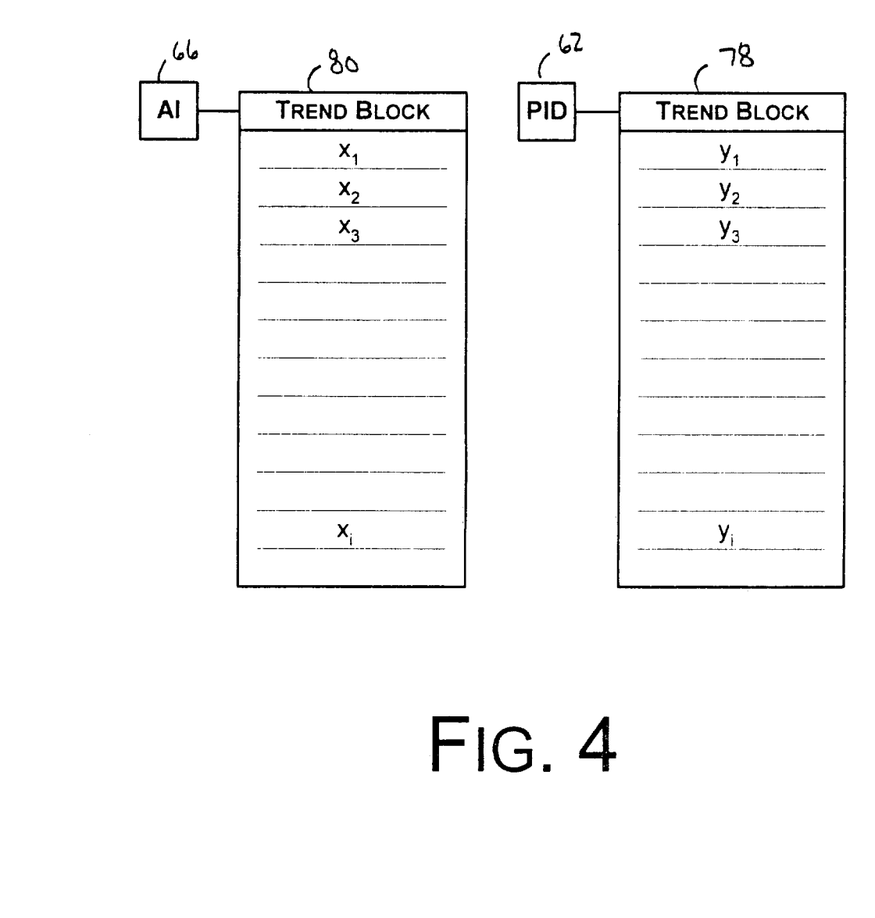
FIG. 4 is schematic block diagram illustrating information flow into data registers associated with an auto-tuning system.

The field device 50, which may be for example a valve positioner, further includes a trend block 78 cooperating with the PID function block 62 and/or the AO function block 64. The trend block 78 essentially acts as a register or a data storage stack to collect and store the received perturbation signal segments $x_i$, as shown in FIG. 4. The received perturbation signal segments $x_i$-$x_1$ are shown stored chronologically, but may be stored in any retrievable order by simply time-stamping the individual segments. Further, it will be understood that, depending upon the particular tuning procedure being used, the received perturbations signal segments $x_i$ may be stored in a first-in-first-out (FIFO) or a last-in-first-out (LIFO) configuration. If the trend block 78 is a standard trend object in Fieldbus protocol, it may periodically execute to store the signal segments $x_i$ and may store a single time stamp associated with the last stored data sample. Of course, the time associated with the other stored data samples may be determined from the time stamp and the periodic sampling rate of the trend object. Alternatively, the trend object 78 could store a time stamp for each data signal segment indicating when the data segment was received. The trend object 78 may also be initiated to start collecting data by the tuning control signal or by a separate signal from the control routine 60 or the auto-tuning routine 76.

Figure 3C:
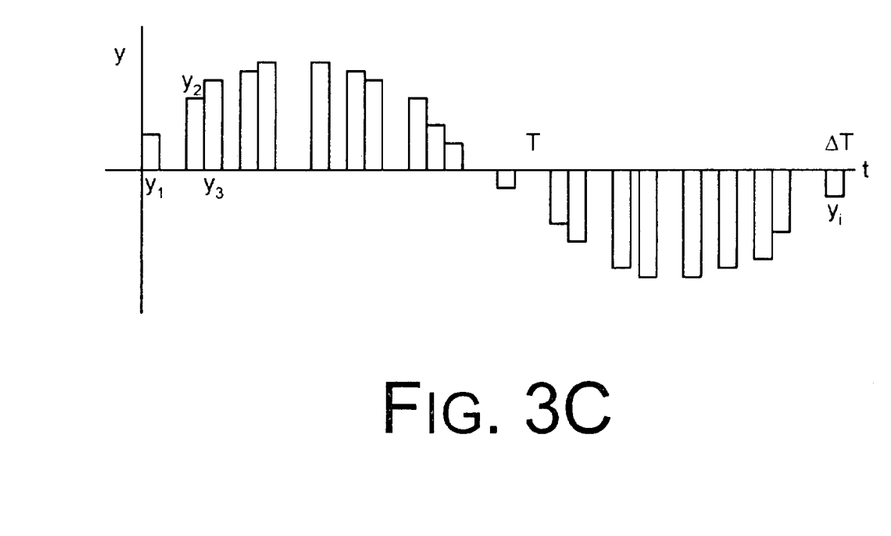

The received perturbation signal segments $x_i$ may then be used by the PID function block 62 to calculate an appropriate control signal for the AO function block 64 based on the received perturbation signal segments $x_i$. While the trend object 78 is illustrated as being connected to receive the inputs to the PID function block 62, such as the received perturbation signal segments $x_i$, it could instead collect and store the outputs of the PID function block 62, such as the control perturbation signal segments $u_i'$, or the inputs to the AO function block 64. As further illustrated in FIG. 2, the AI function block 66 provides the response signal y, in the form of response signal segments $y_i$ as illustrated in FIG. 3C, to drive the PID function block 62 via synchronous Fieldbus communications. Moreover, the AO function block 64 provides a feedback control signal to the PID function block 62.

As will be understood, the AI function block 66 within the field device 52, which may be a transmitter or any other device capable of measuring or detecting the response signal y, is communicatively connected to the field device 50 via the Fieldbus bus 56 (as seen in FIG. 1) and measures the response signal segment $y_i$. The AI function block 66 further provides the measured data to a trend block 80. It should be noted that, although the AI function block 66 measures the response signal segments $y_i$ in a periodic manner based on block execution rate, the response signal segments $y_i$ reflects the actual control signal as acted upon by the field device 50 in an asynchronous or unscheduled manner.

The trend block 80 (which may be initiated in the same manner and/or at the same time as the trend block 78) receives the response signal segments $y_i$ from the AI function block 66 for cataloguing and storage, as shown in FIG. 4 and as described above in connection with the trend block 78. Of course, the trend block 80 also time stamps this data either with a single or multiple time stamps. The trend block 80 contains a partial or complete signal record of when the response signal segments $y_i$ were generated by the field device 50 in response to the perturbation signal segments $x_i$. The signal record contained within the trend block 80 catalogs and stores the response signal y locally (i.e. without having to communicate the response signal segments $y_i$ in an asynchronous manner to the controller 20 or another device during the tuning routine) thereby avoiding the time lag (i.e. $\Delta T$) introduced by the communications scheme. Instead, after the trend blocks 78 and 80 collect certain amounts of data, such as 16 data signals, they can communicate this data all at once or in a single message, asynchronously, to the controller 20. The batch data transfer may be performed in any manner, such as compiling a delimited file or providing a continuous data string in which each portion of the collected data is assigned a specific location within the string, thereby allowing for retrieval of the data if assigned locations are known by the receiving device or devices.

Figure 5:
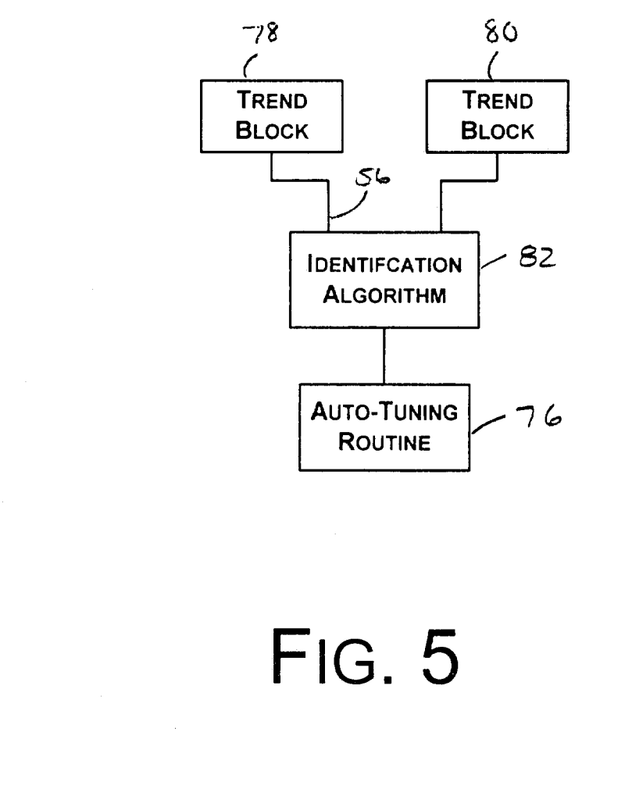
FIG. 5 is a schematic block diagram illustrating a data collection procedure that collects and uses data stored in a pair of data registers of an auto-tuning system.

FIG. 5 illustrates the trend blocks 78 and 80 communicatively connected, via the Fieldbus bus 56 and the I/O device 30, to an identification algorithm 82. The identification algorithm 80, which may or may not be integrated into the auto-tuning routine 76 or the control routine 60, provides a system for compensating for the effects of the communications lag time between auto-tuning routine 76 and the controlled device (e.g., in this instance the field device 50) by relating the received signal segment $x_i$ (or $u_i'$) and the corresponding stored response signal segments $y_i$. For example, the trend blocks 78 and 80 may associate each received signal segment ($x_i$ and $y_i$) with a time stamp thereby indicating when the perturbation signal segment $x_i$ was acted on by the block and when the response signal segment $y_i$ was measured. Because the time stamp indicates, or can be used to determine, when each signal segment ($x_i$ and $y_i$) was locally received or generated by the field devices 50 and 52 it is not necessary to communicate with the control routine 60 continuously, which thereby eliminates the asynchronous communications the time lag. By eliminating the communications lag, the identification algorithm 80 can use the correlated data segments, based on $x_i$ and $y_i$, to more accurately calculate process characteristics of the loop such as ultimate gain, a time constant, and response time, etc. The calculated process characteristics may then be communicated to the auto-tuning routine 76, if necessary, which can, for example, determine new PID gains for the PID function block 66. The auto-tuning routine 76 then communicates these new gain values to the PID function block 62 in an asynchronous manner. Although these exemplary embodiments have referred to PID function blocks, it will be understood that the control element may be any suitable control element such as, for example, a PI function block, a fuzzy logic control function block, a neural network control function block, etc.

Figure 6:
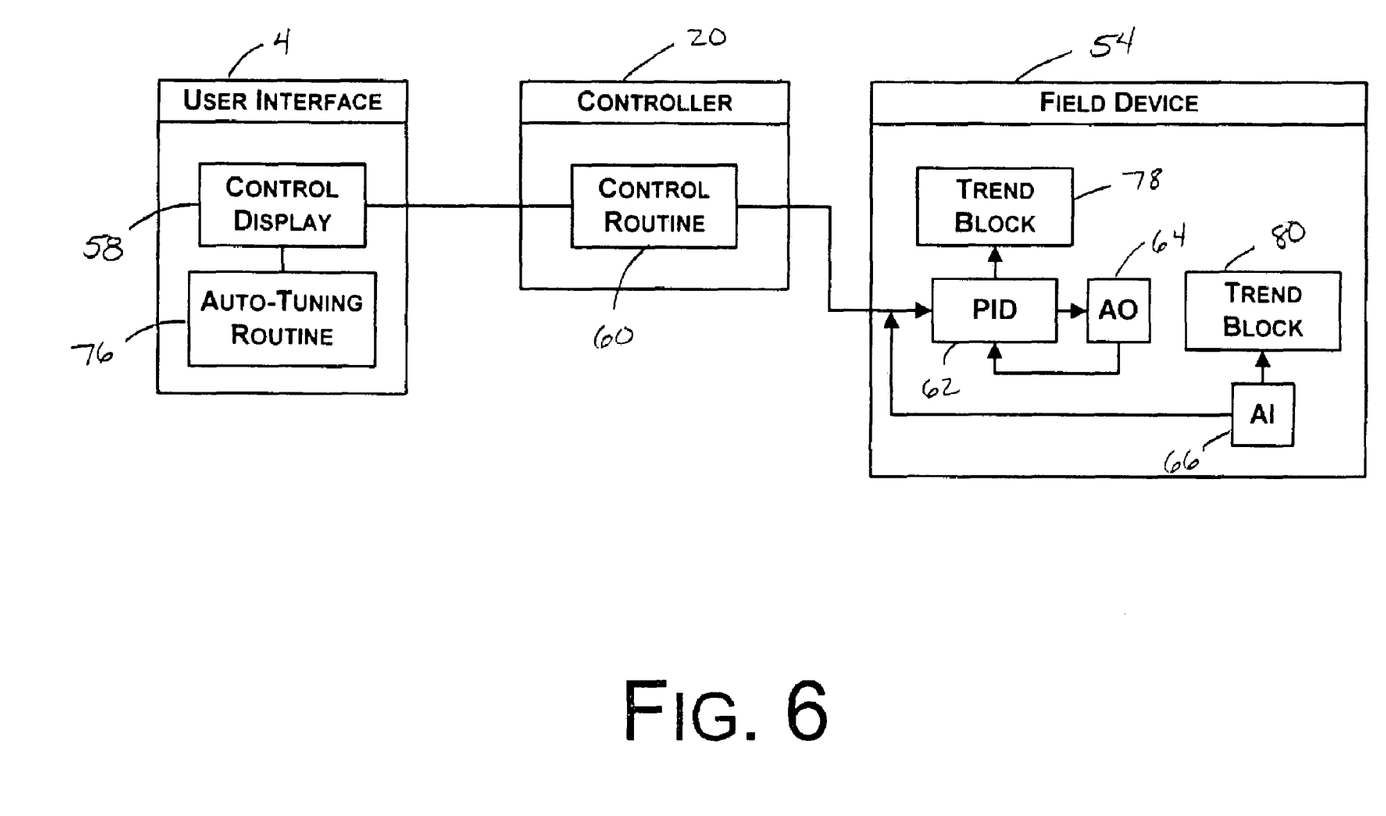
FIG. 6 is schematic block diagram illustrating information flow in another embodiment of an auto-tuning system.

FIG. 6 illustrates a schematic block diagram of an alternate embodiment of the function blocks connected to form an exemplary auto-tuning loop wherein the loop is implemented entirely within a single field device 54. In this exemplary embodiment, the DCN 2 includes the UI 4 which may execute the control display 58 including the auto-tuning routine 76 and be communicatively coupled to the controller 20. The controller 20, in turn, executes the control routine 60 which may include the shadow function blocks 68-70 representing the actual function blocks 62-66 located throughout the process. The auto-tuning routine 76 instructs the control routine 60 to generate the perturbation signal u which is communicated in an asynchronous manner to a field device 54 and is received as the resulting the perturbation signal x.

The field device 54 includes the trend blocks 78 and 80, the PID function block 62, the AO function block 64 and the AI function block 66. In this configuration, the perturbation signal segments $x_i$ (or control perturbation signal segments $u_i'$) are received and cataloged by the first trend block 78, in the manner described above and illustrated in FIG. 4, and may be used to drive the PID 66 function block. The PID function block 62, in turn, is communicatively connected to the AO function block 66 which provides a feedback control signal to the PID function block 62 to form a feedback loop. The AI function block 66 within the field device 54, which may be a transmitter or any other device capable of measuring the response signal y, measures the response signal $y_i$ and provides the measured data in the form of response signal segments $y_i$ to the trend block 80 and to the PID function block 62.

The trend block 80 receives the response signal segments $y_i$ for cataloging and storage and contains a complete signal record of when the response signal segments $y_i$ were generated by the PID 62 function block in response to the perturbation signal segments $x_i$. Because the trend blocks 78 and 80 are included in the field device 54, there is no communications lag ($\Delta T$) caused by the need to communicate in an asynchronous manner between two devices. Thus, the data cataloged and stored in the trend blocks 78 and 80 and provided to the identification algorithm 82, as illustrated in FIG. 5, results in an accurate characterization of the process parameters Thus, in general, to calculate process parameters of the desired accuracy, the trend blocks 78 and 80 collect the desired data segments $x_i$ (or $u_i'$) and $y_i$ locally (i.e., without having to deterministically send the data to the controller 20) while time stamping that data thereby eliminates the mismatch caused by the asynchronous communications lag or delay between the devices. The data segments $x_i$ and $y_i$ (and for the sake of the example, the data segment $x_3$ and $y_3$) represent the received perturbation signal segment and the response signal segment, respectively, and are time stamped in the trend blocks 78 and 80. By calculating the time difference between when the perturbation signal segment $x_3$ was received and when a response signal segment $y_3$, was detected the $\Delta T$ can be determined and ignored or compensated for. The resulting correlated values of $x_3$ and $y_3$ may be used by the auto-tuning routine 76 to calculate process characteristics more accurately. The resulting process characteristics can be used, in any known manner, to determine new tuning parameters, such as new gains for the control elements, e.g., the PID function block 62. These tuning parameters may then be communicated by the auto-tuning routine 76, via the controller 20, to the control function block (e.g., the PID function block 62.)

When implemented, any of the elements described herein, including the function blocks, the trend blocks, etc. may be implemented in software stored in any computer readable memory such as on a magnetic disk, a laser or optical disk, or other storage medium, in a RAM or ROM of a computer or processor, etc. Likewise, this software may be delivered to a user, a process plant, an operator workstation, a controller, a logic solver or any other computing device using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific embodiments, which are intended to be illustrative only and not limiting of the invention, it will be apparent to those of ordinary skill in the art that changes, additions or deletions may be made to the disclosed embodiments without departing from the spirit and scope of the invention.

What is claimed is:

1. An auto-tuner for use in a distributed process control network to tune a process control loop having a control entity that controls a first field device within a process and a measurement entity disposed in a field device that measures a process variable associated with the process, the auto-tuner comprising:

a first tuning element configured to generate a tuning control signal for use by the control entity within the process control loop during a tuning procedure;

a first data collection entity disposed within the first field device that collects and stores a plurality control data signals associated with the control entity during the tuning procedure and a time indication associated with one or more of the control data signals;

a second data collection entity disposed within the same field device as the measurement entity that collects and stores a plurality of measurement data signals associated with the measurement entity during the tuning procedure and a time indication associated with one or more of the measurement data signals; and a second tuning element configured to receive the plurality of control data signals and the plurality of measurement data signals and to determine a tuning parameter for use in tuning the control entity from the plurality of control data signals and the plurality of measurement data signals.

2. The auto-tuner of claim 1, wherein the first and second data collection entities are disposed in the same field device.

3. The auto-tuner of claim 1, wherein the first and second data collection entities are disposed in different field devices.

4. The auto-tuner of claim 1, wherein the first and second data collection entities are trend objects in a fieldbus protocol.

5. The auto-tuner of claim 1, wherein the first tuning element is configured to generate a tuning control signal that causes the control entity to generate a step input or sinusoidal control signal.

6. The auto-tuner of claim 1, wherein the first tuning element is located in the same device as the control entity.

7. The auto-tuner of claim 6, wherein the first tuning element and the control entity are located in a controller.

8. The auto tuner of claim 1, wherein the first tuning element is located in a different device than the control entity and wherein the control entity is located in a field device associated with the process.

9. The auto-tuner of claim 1, wherein the first tuning element generates the tuning control signal for delivery to the control entity and the first data collection entity collects and stores the tuning control signal as received by the control entity.

10. The auto-tuner of claim 1, wherein the first tuning element generates the tuning control signal for delivery to the control entity that causes the control entity to generate an output control signal and wherein the first data collection entity collects and stores the output control signal.

11. The auto-tuner of claim 10, wherein the control entity includes a proportional, integral, derivative control routine.

12. The auto-tuner of claim 10, wherein the control entity includes a proportional, integral control routine.

13. The auto-tuner of claim 10, wherein the control entity is includes a fuzzy logic control routine.

14. The auto-tuner of claim 1, wherein the first data collection entity sends a multiplicity of control data signals to the second tuning element at the same time.

15. The auto-tuner of claim 1, wherein the second tuning element determines an ultimate gain as a process characteristic and uses the ultimate gain to determine the tuning parameter.

16. The auto-tuner of claim 1, wherein the second tuning element determines a time constant as a process characteristic and uses the time constant to determine the tuning parameter.

17. The auto-tuner of claim 1, wherein the first and the second data collection entities communicate with the second tuning element asynchronously via a bus.

18. The auto-tuner of claim 17, wherein the bus is a fieldbus protocol bus.

19. A process control system for use in controlling a process, comprising:
   a controller device connected within the process to perform control activities within the process;
   a plurality of field devices communicatively coupled to the controller, each of the plurality of field devices including a processor and a memory;
   a control loop including a control entity and a measurement element, wherein the measurement element is stored in the memory and is adapted to be executed on the processor of a first one of the field devices; and
   an auto-tuner adapted to tune the control loop, the auto tuner including;
      a first tuning element configured to generate a tuning control signal to cause the control entity to drive the control loop to undergo a tuning procedure;
      a first data collection entity adapted to collect and store a plurality of control data signals associated with the control entity during the tuning procedure and a time indication associated with one or more of the control data signals;
      a second data collection entity disposed within the first one of the field devices and adapted to collect and store a plurality of measurement data signals associated with the measurement element during the tuning procedure and a time indication associated with one or more of the measurement data signals; and
      a second tuning element configured to receive the plurality of control data signals and the plurality of measurement data signals and to determine a tuning parameter for use in tuning the process control loop from the plurality of control data signals and the plurality of measurement data signals
   wherein at least one of the first and second data collection entities is disposed within a different device than the first and second tuning elements.

20. The process control system of claim 19, wherein the first and second data collection entities are disposed in the same field device.

21. The process control system of clam 19, wherein the first and second data collection entities are disposed in different field devices.

22. The process control system of claim 19, wherein the first and second data collection entities are trend objects in a fieldbus protocol.

23. The process control system of claim 19, wherein the first tuning element is located in the same device as the control entity.

24. The process control system of claim 23, wherein the first tuning element and the control entity are located in the controller.

25. The process control system of claim 19, wherein the first tuning element is located in a different device than the control entity and wherein the control entity is located in one of the plurality of field devices.

26. The process control system of claim 19, wherein the first tuning element generates the tuning control signal for the control entity and the first data collection entity collects and stores the tuning control signal as received by the control entity.

27. The process control system of claim 19, wherein the first tuning element generates the tuning control signal that causes the control entity to generate an output control signal and wherein the first data collection entity collects and stores the output control signal.

28. The process control system of claim 19, wherein the first data collection entity sends a multiplicity of the control data signals to the second tuning entity as a single communication packet using asynchronous communications.

29. The process control system of claim 19, wherein the first and the second data collection entities communicate with the second tuning element asynchronously via a bus.

30. The process control system of claim 29, wherein the bus is a fieldbus protocol bus.

31. A method for use in a distributed process control network to tune a process control loop having a control entity that controls at least one field device within the process and a measurement entity that measures a process variable within the process, the method comprising:
   forcing the control entity to control the at least one field device to implement a tuning procedure;
   collecting control data signals associated with the control entity during the tuning procedure within the at least one field device and storing the collected control data signals in a first data stack located in the at least one field device and storing a time indication associated with one or more of the control data signals in the first data stack;
   collecting measurement data signals associated with the measurement entity during the tuning procedure in a field device in which the measurement entity is located and storing the measurement data signals in a second data stack located in the field device in which the measurement entity is located and storing a time indication associated with one or more of the measurement data signals;
   sending the control data signals within the first data stack and the measurement data signals within the second data stack to a second tuning element;
   using the plurality of control data signals and the plurality of measurement data signals to determine a process characteristic for use in tuning the process control loop;
   using the process characteristic to generate one or more tuning parameters and
   sending the tuning parameters to the control entity.

32. The method of claim 31, wherein collecting the control data signals includes using a first trend object in a fieldbus protocol to store the control data signals and wherein collecting the measurement data signals includes using a second trend object in a fieldbus protocol to store the measurement data signals.

33. The method of claim 31, wherein forcing the control entity to control the at least one field device to implement a tuning procedure includes forcing the control entity to create a step input or sinusoidal control signal.

34. The method of claim 31, wherein forcing the control entity to control the at least one field device to implement a tuning procedure includes sending a tuning control signal to the control entity in the at least one field device and wherein collecting the control data signals includes collecting the tuning signal as received by the control entity.

35. The method of claim 31, wherein forcing the control entity to control the at least one field device to implement a tuning procedure includes sending a tuning control signal to the control entity to cause the control entity to produce an output control signal and wherein collecting the control data signals includes collecting the output control signal as generated by the control entity.

36. The method of claim 31, wherein forcing the control entity to control the at least one field device to implement a tuning procedure includes sending a tuning control signal to the control entity to cause the control entity to produce an output control signal which is delivered to a device control entity in at least one field device and wherein collecting the control data signals includes collecting the output control signal as received by the device control entity in the at least one field device.

37. The method of claim 31, wherein sending the control data signals within the first data stack and the measurement data signals within the second data stack to the second tuning element includes sending two or more of the control data signals in a first data message to the second tuning entity and sending two or more of the measurement data signals in a second data message to the second tuning entity.

38. The method of claim 37, wherein the step of sending two or more of the control data signals in the first data message includes sending the first data message asynchronously to the second tuning element and wherein sending two or more of the measurement data signals in the second data message includes sending the second data message asynchronously to the second tuning element.

39. The method of claim 31, wherein using the plurality of control data signals and the plurality of measurement data signals to determine a process characteristic includes determining an ultimate gain as the process characteristic.

40. The method of claim 31, wherein using the plurality of control data signals and the plurality of measurement data signals to determine a process characteristic includes determining a time constant as the process characteristic.

41. The method of claim 31, wherein sending the tuning parameters to the control entity includes sending the tuning parameters to the control entity asynchronously.

42. The method of claim 41, wherein sending the tuning parameters to the control entity includes sending the tuning parameters to the control entity asynchronously via a fieldbus protocol communication bus.

\* \* \* \* \*

UNITED STATES PATENT AND TRADEMARK OFFICE
CERTIFICATE OF CORRECTION

PATENT NO.        : 7,496,041 B2
APPLICATION NO.   : 10/376891
DATED             : February 24, 2009
INVENTOR(S)       : Terrence L. Blevins et al.

It is certified that error appears in the above-identified patent and that said Letters Patent is hereby corrected as shown below:

At Column 11, lines 10-11, "is includes" should be -- includes --.

Signed and Sealed this

Twentieth Day of October, 2009

David J. Kappos
*Director of the United States Patent and Trademark Office*